Dec. 31, 1963
J. D. BYRNE ETAL
3,116,395
ICE DETECTOR SYSTEM
Filed April 26, 1960
6 Sheets-Sheet 2
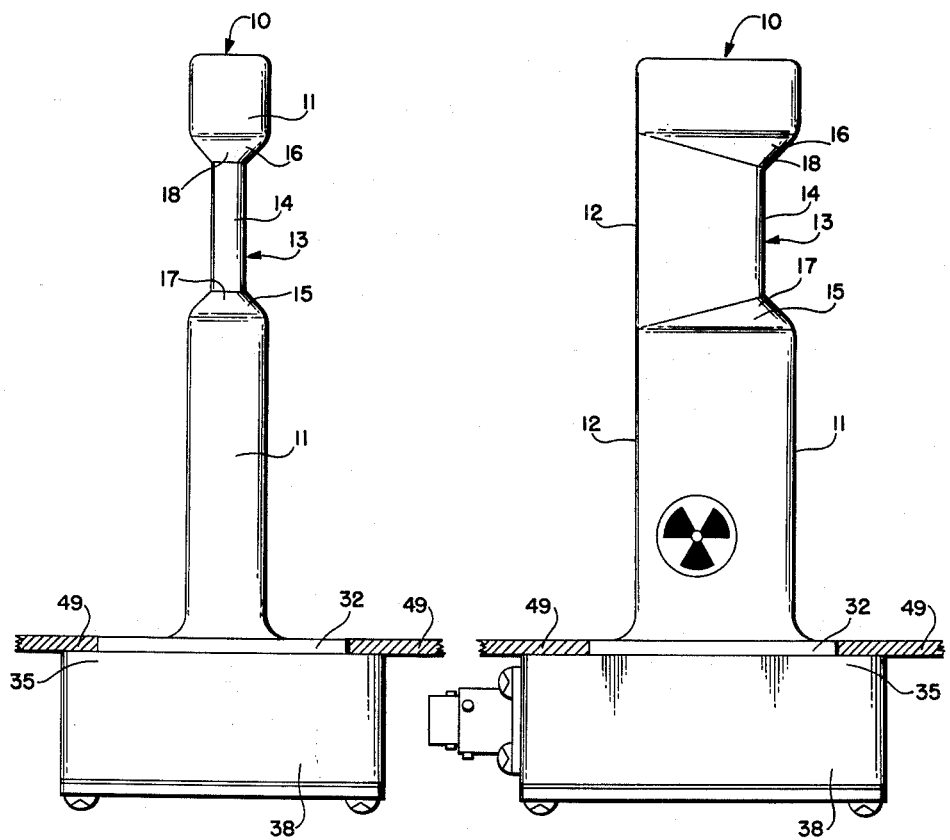
FIG. 2
FIG. 3
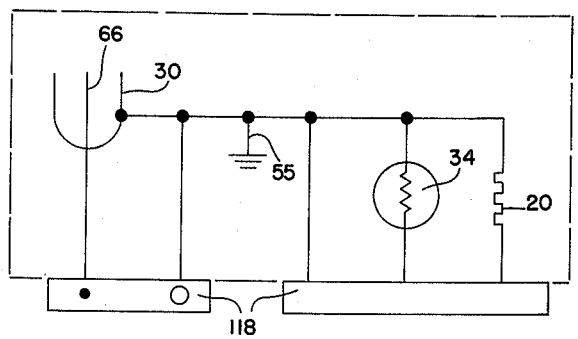
FIG. 4
*INVENTORS*
GERALD W. BERGFORD
BY ROBERT K. KIRSCHNER
JAMES D. BYRNE
*Smith + Tuck*

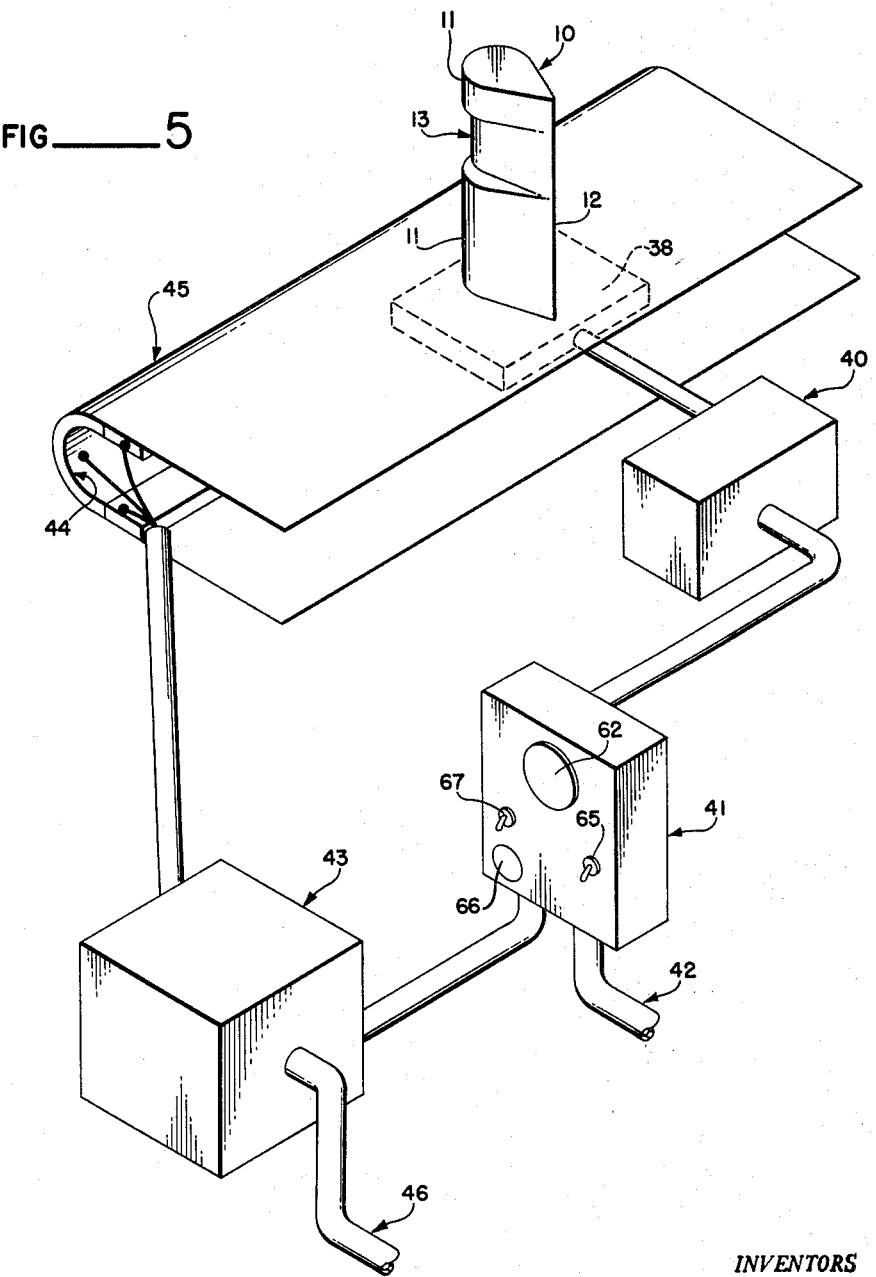

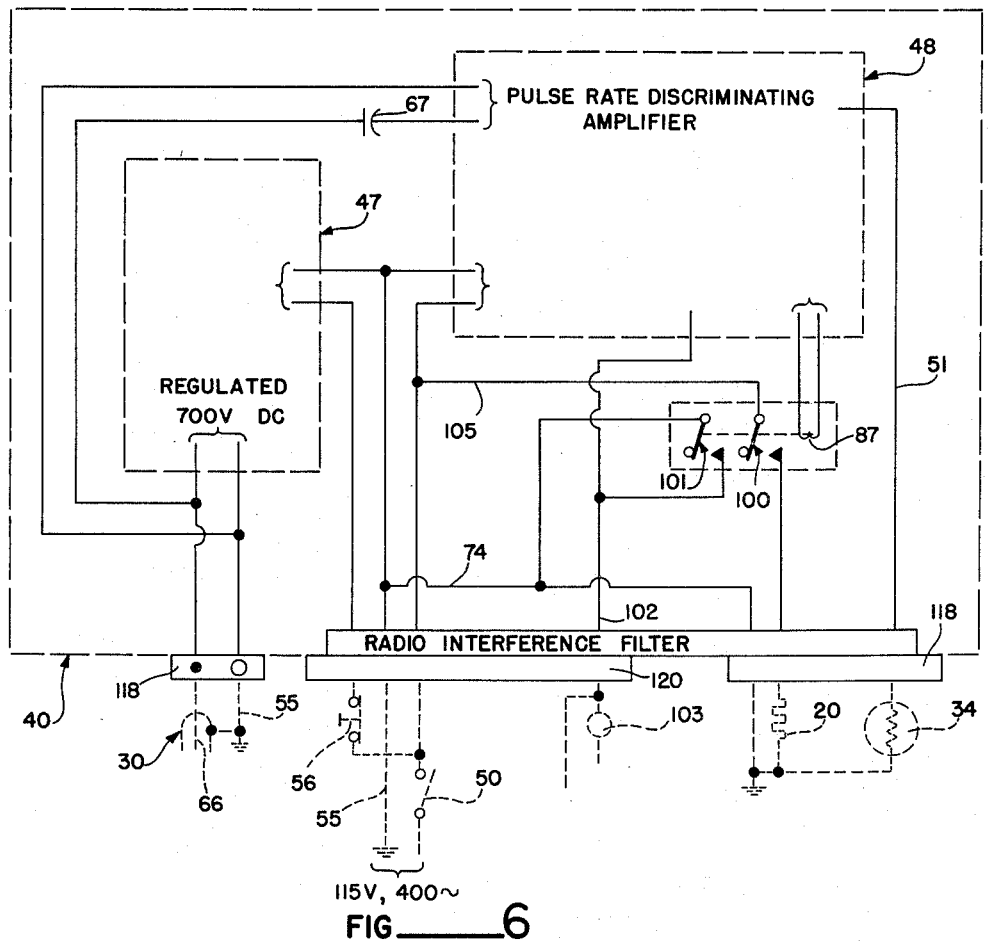

Dec. 31, 1963   J. D. BYRNE ETAL   3,116,395
ICE DETECTOR SYSTEM
Filed April 26, 1960   6 Sheets-Sheet 5
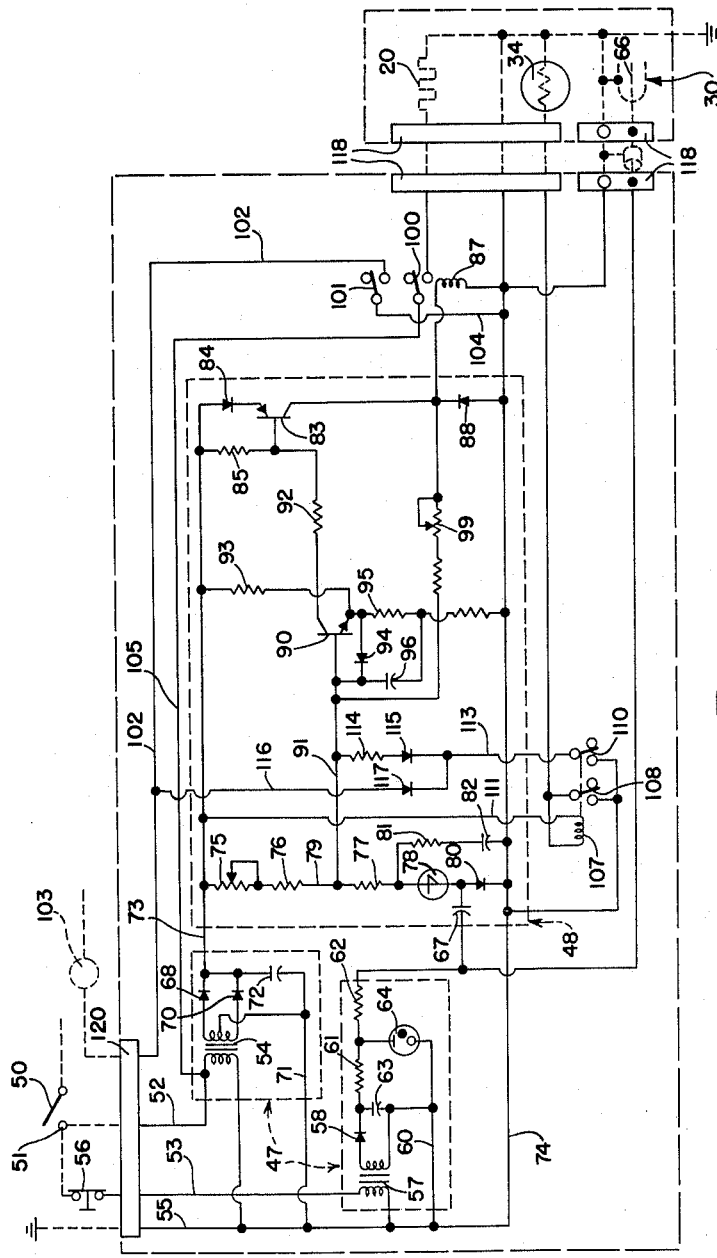
FIG.—7
INVENTORS
GERALD W. BERGFORD
ROBERT K. KIRSCHNER
JAMES D. BYRNE
BY
*Smith & Tuck*

Dec. 31, 1963  J. D. BYRNE ETAL  3,116,395
ICE DETECTOR SYSTEM
Filed April 26, 1960  6 Sheets-Sheet 6
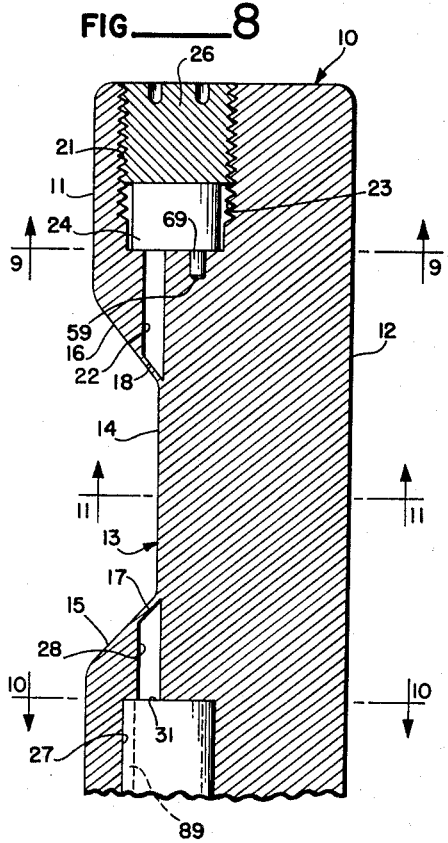
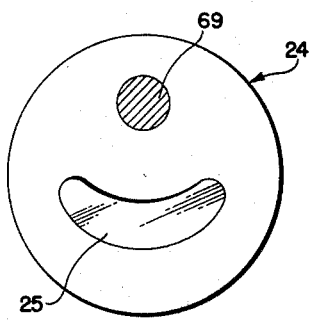
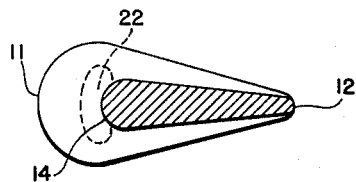
INVENTOR.
GERALD W. BERGFORD
BY ROBERT K. KIRSCHNER
JAMES D. BYRNE
*Smith & Tuck*

United States Patent Office 3,116,395
Patented Dec. 31, 1963

3,116,395
ICE DETECTOR SYSTEM
James D. Byrne, Kirkland, and Gerald W. Bergford and
Robert K. Kirschner, Seattle, Wash., assignors to
United Control Corporation, Seattle, Wash., a corporation of Washington
Filed Apr. 26, 1960, Ser. No. 24,738
3 Claims. (Cl. 219—20)

This invention relates to an ice detector system and, more particularly, to such a system which is compatible for use with aircraft and missiles, either in flight or in a stationary position, and which system comprises means for measuring the build-up of the ice by attenuation of beta rays upon absorption by the ice.

As is well known at the present time, aircraft and missiles in flight are subject to the build-up of ice on their exposed surfaces. This build-up is one of the more serious hazards to which aircraft are exposed as with the build-up of the ice on the lifting surfaces there is an increase in the drag and a reduction in the lift due to a change of the configuration of the lifting surfaces. In this regard the weight increase, due to the accretion of the ice, is of relatively minor importance. In the case of modern jet aircraft, considerable icing of the lifting surfaces can be tolerated without dangerous consequences from the increase in the weight of the ice. However, icing of the engine-intake duct cannot be tolerated due to the loss of propulsive power from the engine as a result of disruption of normal air flow into the engine. Therefore, the ice hazard still exists today with jet aircraft as it previously existed with propeller driven aircraft. However, there is a difference in that with propeller driven aircraft the lifting sections were the dangerous places for ice build-up while today the engine air-intake section is a dangerous area for the ice build-up. This holds true for jet aircraft even though some fly at extremely high altitudes and supersonic speeds. For example, in order to reach the high altitudes, the aircraft must go through speed ranges where icing is prevalent and the atmospheric circumstances are conducive to the formation of ice on the aircraft surface. In addition to icing in flight, icing may occur on the ground.

In view of this icing problem on aircraft and missiles, we have invented a system for the detection of ice and, also, for the removal of ice from aircraft and missiles. This system comprises a probe having a region conducive to the formation of ice. The system is based on the absorption of penetrating radiation by ice. A penetrating radiation source is directed to the region in the probe conducive to the formation of ice. Also, there is a detector for detecting the radiation. As is appreciated, with the build-up of ice between the source and the detector, the penetrating radiation is absorbed so that a smaller amount of radiation reaches the detector. Associated with the detector are means to create a signal to be used to energize a warning light, a de-icing system, etc. when the penetrating radiation falls below a certain predetermined level. Also, associated with the probe is a means for heating the probe and means may be provided to heat the aircraft and missile so as to remove the ice formations thereon. Such a system comprises as its only mechanical moving parts some electrical relays. A penetrating radiation is beta rays. The absorption of the beta rays by the ice is substantially a linear function of the thickness of the ice so that it is easy to calibrate the radiation detector and the associated circuity for actuation of the signal system and the heating means upon the number of beta rays absorbed by the radiation detector falling below a certain predetermined number.

Accordingly, an object of this invention is a provision of an ice detecting system which is small in volume and light in weight.

An additional object is a provision of a probe which is not damaged by temperature changes in the normal range of operation, i.e., minus 65° F. to plus 212° F.

A further object is a provision of a probe which is not sensitive to external pressure changes in the range of normal operation, i.e., zero to 30 p.s.i.a. (pounds per square inch absolute).

A still further object is a provision of an ice detector system which is effective over the entire speed range of all types of aircraft in which icing may be encountered, and which does not require forward motion for provision of a reference condition, e.g., stagnation pressure.

Another object is the provision of a system with such a fast response time that even with a rapid build-up of ice the ice-removal system can immediately start to function.

A further object is the provision of an ice detector system which can sense ice at any location on an aircraft.

Another object is to provide an ice detector system having a probe with a high icing efficiency, viz., a small leading edge radius, so that the formation of ice is sensed at an early stage of development.

An additional object is to provide an ice detector system which does not require a portion of the airplane surface for ice accretion.

These and other objects and advantages of the invention will be brought forth upon reference to the accompanying drawings, the detailed description and the appended claims.

In the drawings:

FIGURE 2 is an elevational view looking at the front of the probe.

FIGURE 3 is an elevational view looking at the side of the probe.

FIGURE 4 is a schematic wiring diagram of the probe and illustrates the radiation detector, the heat sensing means and the heating means.

FIGURE 5 is a schematic diagram illustrating the probe on an air-foil, and the supporting structure for the probe for controlling the de-icing operation.

FIGURE 6 is a schematic wiring diagram of the probe and the supporting structure for controlling the de-icing operation.

FIGURE 7 is a schematic diagram of the ice detector controller.

FIGURE 8 is a fragmentary, vertical longitudinal cross-sectional view of the probe and illustrates the position of the source of radiation and the radiation detector with respect to the region conducive to the formation of ice.

FIGURE 9 is a lateral cross-sectional view taken on line 9—9 of FIGURE 8, and is looking at the underneath surface of the container for the source of the penetrating radiation.

FIGURE 10 is a lateral cross-sectional view taken on line 10—10 of FIGURE 8, and is looking at the top of the Geiger-Müller tube; and, FIGURE 11 is a lateral cross-sectional view of the probe at the "waisted" area and is taken on line 11—11 of FIGURE 8.

Figure 1:
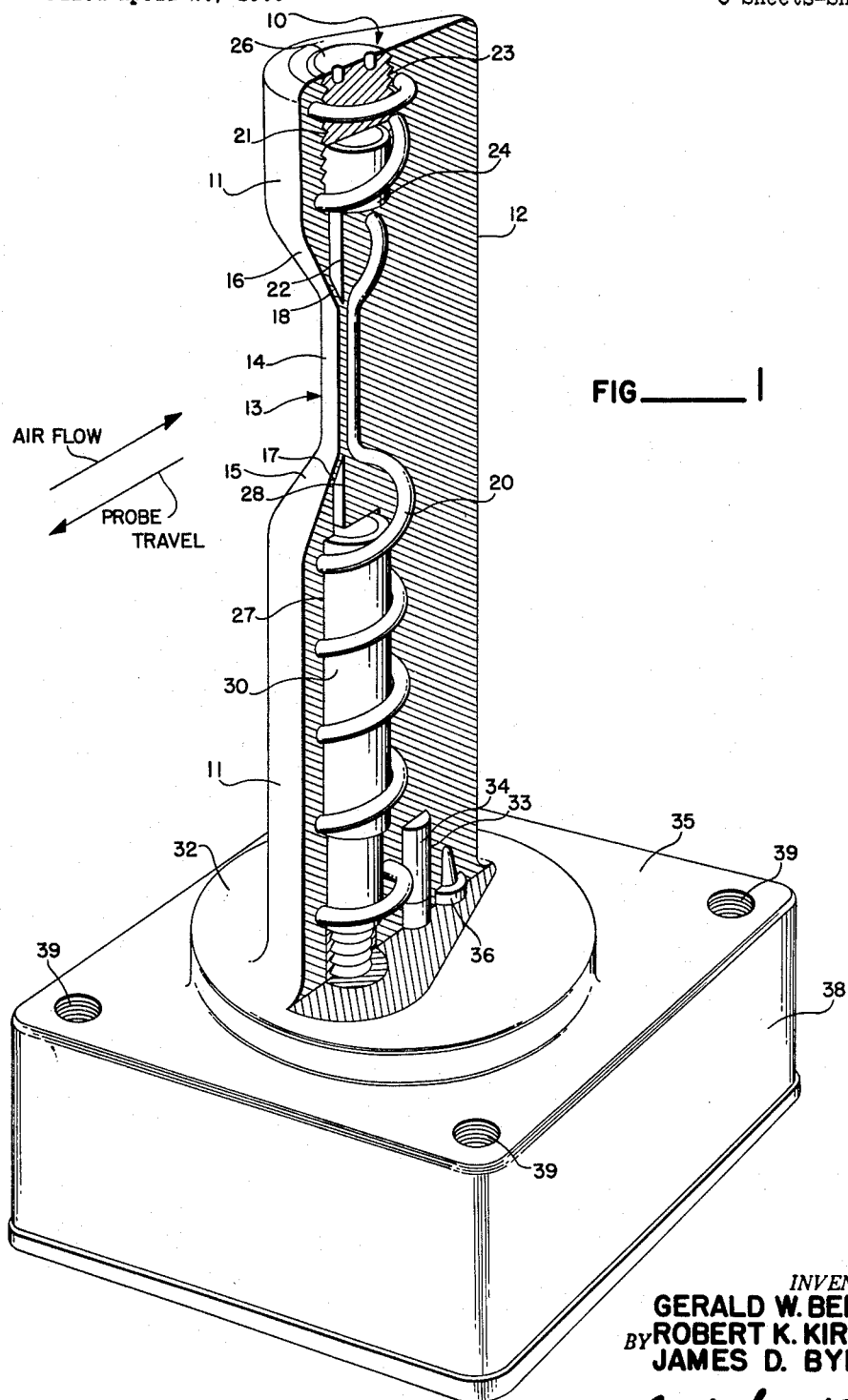
FIGURE 1 is a vertical, longitudinal cross-sectional view of the probe mounted on a base, and shows the source of radiation, the radiation detector and a spiraling heating element for melting ice on the probe.

Referring to the drawings it is seen that the ice detection system comprises a probe 10. This probe is relatively long with respect to its width and presents a relatively large leading surface or edge 11 and a relatively thin trailing edge 12. Referring to FIGURE 1 it is seen that the leading edge or surface 11 is a rounded surface which tapers to the trailing edge 12. A probe 10 near its outer or free end is cut down or recessed to form a "waisted" section 13. The "waisted" section 13 presents a rounded leading surface 14 which in turn is of less width than the rounded leading surface 11 of the main body of the probe, see FIGURE 2. Also, the leading surface 14 is set inwardly or recessed backwardly with respect to the surface 11, see FIGURE 3. Between the main body of the probe and the "waisted" section 13 there is an inwardly sloping shelf 15, and between the "waisted" section 13 in the outer end of the probe there is an outwardly sloping shelf 16. From the standpoint of air flow when the aircraft is in flight, the flow of air impinges on the surface 11 and on the surface 14.

In the sloping shelf 15 there is an aluminum window 17 and in the sloping shelf 16 there is an aluminum window 18.

In the probe is an electric tubular heater 20 which coils from the bottom of the probe to the tip of the same.

In the outer end of the probe there is a drilled passageway or cavity 21 and which cavity is substantially parallel to the longitudinal axis of the probe. The cavity 21 is extended into a second drilled passageway 22. The passageway 22 extends substantially to the window 18. Actually, the window 18 is that part of the probe between the sloping shelf 16 and the end of the passageway 22. It is thin having a thickness of about one hundreth (0.01) inch. The main purpose of this window is to prevent the entrance of contaminants such as dust and the like into the passageway 22. The outer end of the passageway 21 is tapped at 23. In the inner end of the passageway 21 and in the passageway 22 is a container 24. This container may be of aluminum and contains the source of the penetrating radiation or beta rays, e.g., strontium 90. Referring to FIGURE 9, it is seen that in the bottom surface of the container 24 there is a kidney-shaped window 25. This window may be of a thin sheet of stainless steel. A cap 26 is screwed into the tapped hole 23 so as to seal the container 24 therein. At this time it is appropriate to state the lateral cross-sectional configuration of the passageway 22 is of a kidney shape like the window 25. The window 25 and the passageway 22 curve so as to conform to the configuration of the leading edge 14 of the "waisted" section 13.

As previously stated, the strontium 90 is sealed in the aluminum alloy container 24. More particularly, the strontium 90 is the chemical form of strontium sulfate. The strontium sulfate is permanently sandwiched in gold foil. In turn, the gold foil is permanently incapsulated in the aluminum housing 24. The beta rays pass through the stainless steel window or Monel metal window 25. Some of these rays pass through the passageway 22 and the window 18. In certain instances it may be desirable to use a source of penetrating radiation other than strontium 90 such as other isotopes.

In the main body of the probe 10 there is a longitudinal drilled passageway 27 which is extended by a smaller drilled passageway 28 to substantially meet the window 17. Actually, the window 17 is that part of the probe between the sloping shelf and the end of the passageway 28. It is thin having a thickness of about one hundreth (0.01) inch. The main purpose of this window is to prevent the entrance of contaminants such as dust and the like into the passageway 28. In this passageway there is positioned a Geiger-Müller tube 30. On the upper end of the tube is a mica window 31 for receiving the beta rays from the tube 25. This window is about two ten thousandths (0.0002) of an inch in thickness. The tube comprises a stainless steel cylinder 89 for housing the anode. Referring to FIGURES 8 and 9, it is seen that in the base of the cavity there is a drilled hole 59 and on the bottom of the container 24 there is a stud 69. The stud 69 and the hole 59 coact so as to position the source of the penetrating radiation in the container with respect to the passageway 22.

As previously stated the container 24 is of aluminum and absorbs most of the penetrating radiation. The window 25 is of Monel metal and is about two thousandths (0.002) of an inch in thickness so as to permit some of the penetrating radiation to escape from the container 24. The Monel metal is a nickel-copper alloy. It is unique in that the nickel and copper in it are refined from the ore without separation and is, therefore, referred to as a "natural alloy." Some of the penetrating radiation enters the tube or channel 22 at such an angle so as to strike the aluminum casting of the probe and to be absorbed by it. Some of the penetrating radiation passes through the tube 22, the window 18, substantially parallel to the surface 14, through the window 17, through the passageway 28, the mica window 31 and into the Geiger-Müller tube 30. The window 18 and 17, even though of aluminum, are so thin as to offer minimum interference with the penetrating radiation. Under certain circumstances it may be desirable to use a window of mica, Monel metal or beryllium.

The probe 10, on its inner end, expands into circular base member 32 which in turn is integral with a mounting plate 35. In this mounting plate are mounting holes 39.

In the main body of the probe 10 and in the base there is a drilled passageway or cavity 33. In this passageway there is positioned a heat-sensing means 34, viz., a thermistor tube.

Also, in the main body of the probe 10 and the base 32 there is an electrical connection 36 which connects with the tubular heating element 20. The probe 10 is of cast aluminum and is cast around the electrical connection as well as the heating element 20.

The probe 10, base 32 and mounting plate are mounted on an electrical junction box 38. The junction box 38 may be attached to the skin 49 of the aircraft.

The probe 10, through suitable electrical connections, connects with an ice detector controller 40. In turn, the controller 40 connects with the test panel 41 through suitable electrical connections. Leading into the control panel 40 is an electrical power source 42. Also, the panel 41 connects with the de-icing programmer 43. The de-icing programmer 43 connects with the de-icing boots 44 in the airfoil 45. The de-icing programmer 43 is supplied with electrical power through connections 46. This is more schematically illustrated in FIGURE 5.

In FIGURE 6 there is presented a schematic diagram of the controller 40, and in FIGURE 7 there is presented a wiring diagram of the controller.

The controller comprises a power source 47 and a pulse-rate-discriminating amplifier 48. The power source 47 is supplied through switch 50 by a 115 volt A.C. 400 cycles per second power source on the airplane. The switch 50 makes contact with the input contact 51. Two leads branch off this contact, a first lead 52 and a second lead 53. The lead 52 connects with the primary of a transformer 54. This primary in turn is grounded to the ground 55.

In the lead 53 there is a test switch 56. The lead 53 connects with the primary of a transformer 57 and which in turn is grounded to 55. A first lead of the secondary of the rectifier 57 is connected to a high voltage silicon rectifier 58 while the second lead is connected to wire 60. The wire 60 connects with the ground 55. The rectifier 58 leads into a resistance 61 and a resistance 62. A condenser 63 is between the rectifier 58 and the resistance 61, and the second lead. A gas-filled tube 64 is between the resistances 61 and 62 and the lead 60. The resistance 62 connects by lead 65 with anode 66 of the Geiger-Müller tube 30. The outlet of the resistance 62, i.e., the 700 volt D.C. power supply, connects with the pulse-rate-discriminating circuit 48 through a condenser 67.

Before discussing the amplifier 48, the 30 volt D.C. power supply for the same will be described. The 700 volt D.C. power supply is not the power input for the amplifier 48, but is the power supply for the Geiger-Müller tube 30.

The two leads of the secondary of the transformer 54 connect with the two rectifiers 68 and 70 so as to provide full-wave rectification. The secondary is center tapped so as to connect through wire 71 with the ground 55. The outlet of the two rectifiers 68 and 70 connect with the wire 71 by means of condenser 72. Also, the outlet of the two rectifiers 68 and 70 lead into the amplifier 48 through lead 73. In the amplifier is a ground 74.

Between the input 73 and the ground 74 is an adjustable resistor 75, fixed resistors 76 and 77, a pulse tube 78 and a rectifier 80 in a series 79. The signal from the Geiger-Müller tube 30 is introduced into the amplifier through the condenser 67 and between the rectifier 80 and the pulse tube 78. Between the resistance 77 and the pulse tube 78 there is a resistor 81 and a condenser 82 and which resistor and condenser connect with the ground 74.

Between the lead 73 and the ground 74 there is a transistor 83. In the emitter circuit of this transistor there is a rectifier 84 and in the base circuit from the lead 73 there is a resistance 85. The collector connects with a lead 86 for a heater relay 87 external to the amplifier. The heater relay 87 connects with the ground 74. Between the ground 74 and the lead 86 there is a rectifier 88.

Also, between the input 73 and the ground 74 there is a transistor 90. The base of this transistor connects with the series 79, by a wire 91 between the resistors 76 and 77. The collector of 90 connects with the base of 83 through a resistance 92. The emitter of 90 connects with 73 through a resistor 93. Also, the emitter of 90 is joined to the base through a rectifier 94 and a resistor 95 and a condenser 96 in parallel with the rectifier. The condenser 96 and the resistor 95 connect with the ground 74 through a resistor 97. The heater input 86 connects with 91 but in 86 there are two resistances, viz., fixed resistor 98 and adjustable resistor 99.

As part of the controller there is the heater 20 and the thermistor 34. The heater relay controls two switches 100 and 101.

The switch 101 bridges contacts between a 28 volt D.C. line 102 having an indicator light 103 and a ground lead 104 which connects with the ground 74.

The switch 100 bridges contacts between the 115 volt A.C. 400 cycle line, see line 105, and the heater 20. The heater is grounded at 106.

Another part of the system is an overheat-protection relay 107 which controls switches 108 and 110. The relay 107 connects with the line 73 through 111 and connects with the thermistor 34 and through 112.

The switch 108 bridges the contacts between the line 112 leading to the thermistor and the line 74.

The switch 110 bridges the contacts between the line 74 and the line 102 and the line 91. A line 113 is between the line 91 and one of the contacts of the switch 110. In the line 113 is a resistor 114 and a rectifier 115. A line 116 connects with the line 113 between the rectifier 115 and the switch contact. In the line 116 is a rectifier 117.

In FIGURE 7 reference numeral 118 refers to the electrical adapter for connecting the probe unit with the controller and 120 refers to the electrical plug for connecting the controller unit to the control panel.

In operation the switches 50 and 56 are closed so as to supply power to the power supply 47. With the build-up of ice in the "waisted" section 13 of the probe, the number of beta rays reaching the Geiger-Müller tube is decreased. In other words, the frequency of the beta rays is decreased. The amplifier is of a bi-stable character. It is calibrated to trigger at a predetermined pulse frequency corresponding to a certain ice thickness in the "waisted" section. Upon the pulse frequency decreasing to a certain value, the amplifier control voltage is increased so as to actuate the heater relay 87. This heater relay forces the switches 100 and 101 to close. As a result the circuit in which light 103 is a component is closed and the light indicates that a predetermined ice condition has been reached. Also, with the closing of the switch 100, electrical energy is sent through the heater 20 so as to heat the probe and melt the ice. After the temperature of the probe reaches a predetermined ice temperature, the thermistor is actuated so as to close the circuit which, in turn, actuates the relay 107, the overheat protection relay. With the actuation of the relay 107 the switches 108 and 110 are closed. As a result the electrical energy to the heater 20 is, in effect, shortened through the switch 110 so as to no longer heat the heating element 20. With the melting of the ice in the "waised" section 113, the pulse-rate frequency of the beta rays increases and, in effect there is insufficient electrical energy to the heater relay 87 to maintain the switches 100 and 101 in closed position.

From the above it is seen that the thermistor is for "overheat" protection. The heater shuts off upon removal of the ice and restoration of high frequency radiation.

To verify the operational capacity of the system, the test switch 56 is opened. This cuts off the high voltage power supply to the Geiger-Müller tube and simulates the effect of an icing condition. As is appreciated, the ice-warning light 103 lights up and the probe heater 20 heats. Releasing the test switch 56 restores potential power to the Geiger-Müller tube simulating ice removal with the accompanying automatic extinguishing of the ice-warning light 103 and the energization of the probe heater 20.

Again, referring to FIGURE 7, it is seen that this circuit is a bridge-type circuit having components 75 and 76 in one leg; 77, 78 and 80 in one leg; 93 in another leg; and, 95 in a fourth leg. There is provision for amplifying the unbalance signal from the bridge to actuate the relay 87.

Although the ice detector system comprises a "waisted" section 14 it is to be realized that another configuration may be employed. More particularly, a wire having the source of penetrating radiation at one end and the detector at the other may be used. The advantage of the "waisted" section and the wire is that the air flow is not disturbed to any great extent. Therefore, the air having supercooled water droplets, i.e., cooled below the freezing point of water so that the liquid droplets have a temperature less than about 320° F., will so flow past the airfoil that the droplets will impinge upon the surface of the airfoil. The smaller the leading edge of the airfoil the less the disturbance and the greater the possibility of the supercooled liquid droplets impinging the airfoil.

The position of the source of penetrating radiation and the detector with respect to the position of the surface 14 is conducive to the formation of ice. It is seen that the source and the detector are so positioned that the detector detects the penetrating radiaion which is substantially parallel to the surface 14. As a result, an ice build-up of one-sixteenth (1/16") of an inch appears as thick as the length of the surface 14 between the source and the detector. From this it is seen that the probe is sensitive to the build-up of ice and actually gives an indication of ice formation before reaching the critical stage. In this regard it is known that approximately one inch of ice will completely absorb beta rays emanating from strontium 90. Therefore, by having the length of the surface 14 slightly greater than one inch the beta rays will be absorbed even through the inch thickness is only one-sixteenth (1/16") of an inch. The system is then activated to give the ice-warning signal.

From the above it is seen that there is an ice detector system based on the absorption of beta rays by ice. This system is capable of operating over a wide temperature range from about 65° F. to approximately plus 212° F.; an external pressure range from zero to about 30 pounds per square inch absolute; and the voltage variations between 102 and 124 volts A.C. and frequency variations of 380 to 420 cycles per second.

Having presented our invention, what we claim is:

1. A probe for determining ice formation comprising a probe element adapted for securement to aircraft and missiles and operative independent of the functional portions thereof, said probe element including an intermediate recessed section of reduced width and airfoil cross-section, said recessed section comprising a rounded leading surface conducive to the formation of ice, a source of radioactive penetrating radiation, the penetrability of which is sensitive to the presence of ice, a radiation detector, said source of radiation and said radiation detector being aligned with one another and positioned within said probe element on opposite sides of said intermediate section immediately in advance of said rounded leading surface, whereby formation of ice on said leading surface can be immediately detected by the reduction in radiation intensity occasioned by passage of radiation laterally through the layer of ice which forms on said leading surface.

2. A probe as recited in claim 1 in which said probe element is an elongated element of airfoil cross-section.

3. A probe as recited in claim 2 in which said probe includes heating means positioned adjacent to the leading surface of said recessed section and to the leading surfaces of said probe element, means responsive to a reduced radiation intensity to actuate said heating means to melt the ice on the probe, and heat sensitive means responsive to increased temperature to discontinue the operation of said heating means.

References Cited in the file of this patent

UNITED STATES PATENTS

| | | |
|---|---|---|
| 2,359,787 | Peters et al. | Oct. 10, 1944 |
| 2,476,217 | Pond | July 12, 1949 |
| 2,480,846 | Friedman et al. | Sept. 6, 1949 |
| 2,541,512 | Hahn | Feb. 13, 1951 |
| 2,670,912 | Lindsey et al. | Mar. 2, 1954 |
| 2,775,680 | Flubacker | Dec. 25, 1956 |
| 2,816,233 | Krueger | Dec. 10, 1957 |